United States Patent
Daniel

(10) Patent No.: US 12,479,282 B2
(45) Date of Patent: Nov. 25, 2025

(54) ELECTRIC DRIVETRAIN

(71) Applicant: Omni Powertrain Technologies, LLC., Houston, TX (US)

(72) Inventor: Craig Daniel, Honolulu, HI (US)

(73) Assignee: Omni Powertrain Technologies, LLC., Houston, TX (US)

( * ) Notice: Subject to any disclaimer, the term of this patent is extended or adjusted under 35 U.S.C. 154(b) by 918 days.

(21) Appl. No.: 17/654,161

(22) Filed: Mar. 9, 2022

(65) Prior Publication Data

US 2022/0289011 A1 Sep. 15, 2022

Related U.S. Application Data

(60) Provisional application No. 63/159,319, filed on Mar. 10, 2021.

(51) Int. Cl.
*B60K 1/02* (2006.01)
*B60K 17/02* (2006.01)
(Continued)

(52) U.S. Cl.
CPC ............. *B60K 1/02* (2013.01); *B60K 17/02* (2013.01); *B60K 17/04* (2013.01); *B60K 17/165* (2013.01);
(Continued)

(58) Field of Classification Search
CPC .. B60K 2001/001; B60K 17/02; B60K 17/04; B60K 17/165
See application file for complete search history.

(56) References Cited

U.S. PATENT DOCUMENTS 5,443,130 A * 8/1995 Tanaka ............... H02K 7/116
                                                  180/65.6
9,387,756 B1 * 7/2016 Whiting ............... B60W 10/26
(Continued)

FOREIGN PATENT DOCUMENTS

CN       103538468 A    1/2014
CN       106042945 A    10/2016
(Continued)

OTHER PUBLICATIONS

Office Action issued for Japanese Patent Application No. 2023-555233, dated Aug. 29, 2024, 4 pages.
(Continued)

*Primary Examiner* — Jeffrey J Restifo
(74) *Attorney, Agent, or Firm* — Haynes and Boone, LLP; Mark A. Tidwell

(57) ABSTRACT

An electric drivetrain having an axial flux electric motor disposed along a drivetrain axis, the axial flux electric motor disposed to rotate a hollow motor output shaft extending along the drivetrain axis, which hollow motor output shaft engages a first planetary gearset. The first planetary gearset may be engaged and disengaged with a second planetary gearset that is coupled to a differential which, in turn, drives first and second main driveshafts, each of which also extends along the drivetrain axis. The first main driveshaft drives a first wheel hub assembly and the second main driveshaft passes coaxially through the planetary gearsets, the hollow motor output shaft and the axial flux electric motor to drive a second wheel hub assembly.

19 Claims, 4 Drawing Sheets

(51) Int. Cl.
  *B60K 17/04* (2006.01)
  *B60K 17/16* (2006.01)
  *F16H 57/037* (2012.01)
  *H02K 7/00* (2006.01)
  *H02K 7/116* (2006.01)
  *H02K 16/02* (2006.01)
  *F16H 57/02* (2012.01)

(52) U.S. Cl.
  CPC ......... *F16H 57/037* (2013.01); *H02K 7/003* (2013.01); *H02K 7/116* (2013.01); *H02K 16/02* (2013.01); *F16H 2057/02034* (2013.01); *F16H 2057/02052* (2013.01)

(56) References Cited

U.S. PATENT DOCUMENTS

| | | | | |
|---|---|---|---|---|
| 10,253,857 | B2* | 4/2019 | LaForce | B60K 17/16 |
| 11,034,237 | B2* | 6/2021 | Hirao | F16H 63/30 |
| 11,845,328 | B2* | 12/2023 | Downs | B60K 17/16 |
| 12,043,099 | B1* | 7/2024 | Hayes | F16H 3/093 |
| 12,077,041 | B2* | 9/2024 | Gerding | F16H 63/3433 |
| 12,214,650 | B2* | 2/2025 | Massari | B60K 17/16 |
| 2022/0289011 | A1* | 9/2022 | Daniel | B60K 17/165 |
| 2023/0373245 | A1* | 11/2023 | Pfeffer | F16H 57/02 |
| 2024/0198793 | A1* | 6/2024 | Hose | B60K 1/00 |
| 2024/0270067 | A1* | 8/2024 | Karlsson | B60K 17/165 |
| 2024/0271691 | A1* | 8/2024 | Oota | F16H 57/0412 |
| 2024/0271699 | A1* | 8/2024 | Van Raepenbusch | F16H 63/3466 |
| 2025/0001852 | A1* | 1/2025 | Lenon | B60K 17/16 |
| 2025/0001857 | A1* | 1/2025 | Lenon | B60K 17/08 |
| 2025/0100364 | A1* | 3/2025 | Windom | F16H 48/10 |
| 2025/0136068 | A1* | 5/2025 | Pavuk | B60K 1/00 |

FOREIGN PATENT DOCUMENTS

| | | |
|---|---|---|
| CN | 210283922 U | 4/2020 |
| DE | 102020122659 A1 | 3/2022 |
| JP | 2018028365 A | 2/2018 |
| JP | 2020200939 A | 12/2020 |

OTHER PUBLICATIONS

Search Report and Written Opinion issued for International Patent Application No. PCT/US2022/071047, dated Jul. 29, 2022, 13 pages, ISA/US.

* cited by examiner

ELECTRIC DRIVETRAIN

CROSS-REFERENCE TO RELATED APPLICATION

This application claims the benefit of the filing date of, and priority to, U.S. Patent Application No. 63/159,319, filed Mar. 10, 2021, the entire disclosure of which is hereby incorporated herein by reference.

FIELD OF THE INVENTION

This application relates generally to electric vehicles, and, more particularly, to an electric vehicle drivetrain.

BRIEF DESCRIPTION OF THE DRAWINGS

The invention will be further described with reference to the accompanying drawing wherein like numbers refer to like parts in the several views, and wherein.

DETAILED DESCRIPTION

Figure 1:
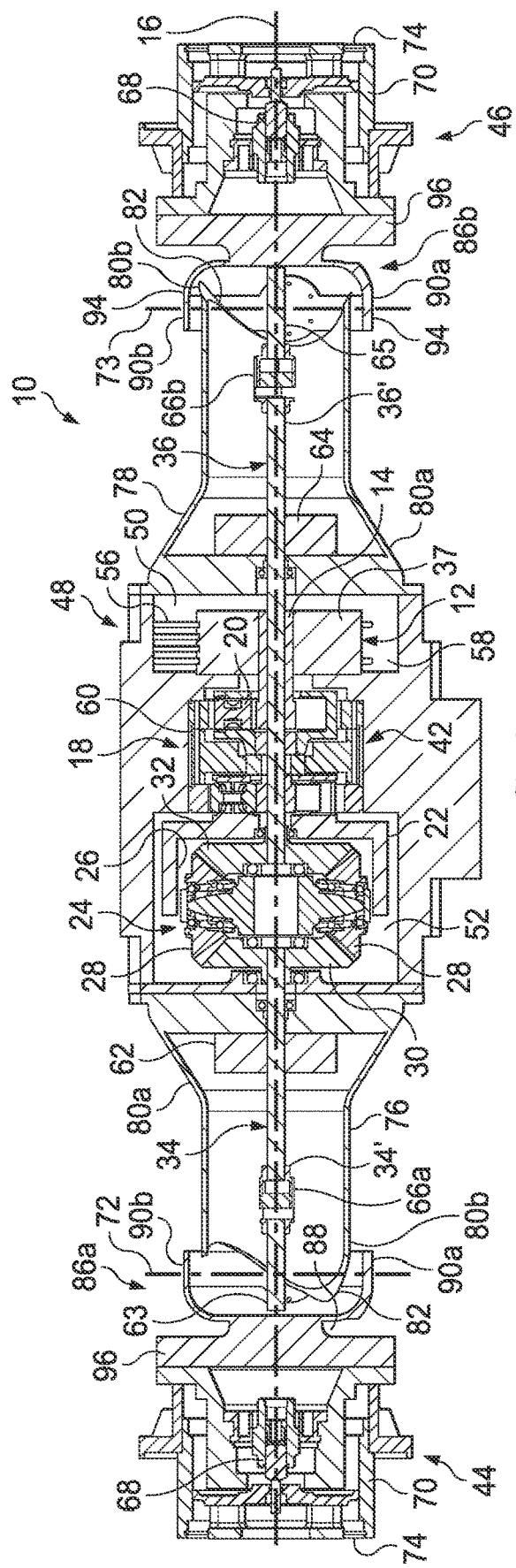
FIG. 1 is a cross-sectional view of an electric drivetrain, according to one or more embodiments.
Figure 2:
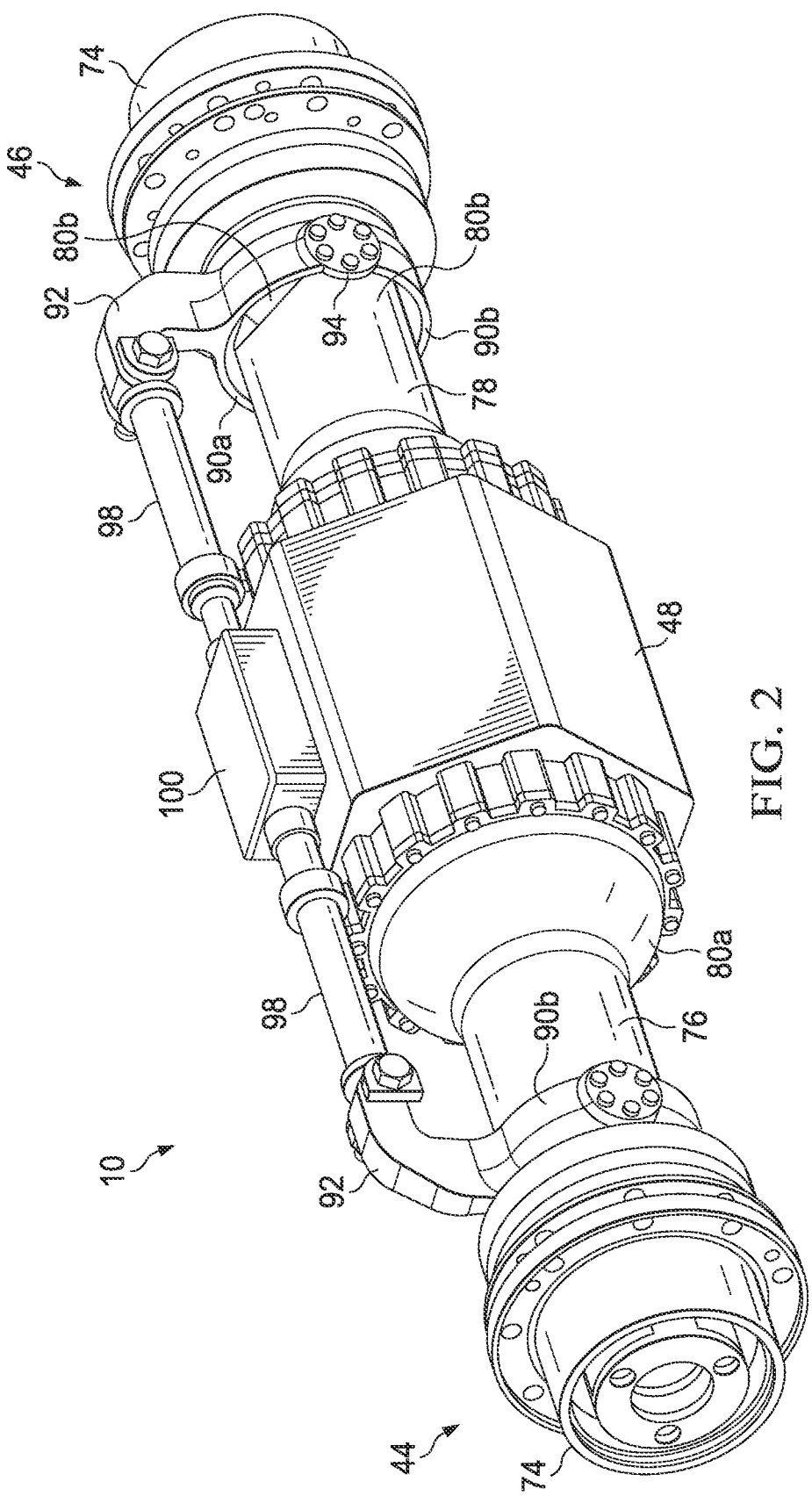
FIG. 2 is a perspective view of the electric drivetrain of FIG. 1, according to one or more embodiments.

Referring to FIGS. 1 and 2, an electric drivetrain 10 is shown. The electric drivetrain 10 includes at least one axial flux electric motor 12, a planetary gearset 18, a differential 24, a first main driveshaft 34, and a second main driveshaft 36 each disposed along a drivetrain axis 16. The axial flux electric motor 12 rotates a hollow motor output shaft 14 defined along the drivetrain axis 16. In some embodiments, the hollow output shaft 14 of the axial flux electric motor 12 is or includes a spool through which the second main driveshaft 36 passes, as will be described in further detail below. In some embodiments, the axial flux electric motor 12 includes at least one rotor mounted on the hollow output shaft 14. For example, the axial flux electric motor 12 may include at least one rotor mounted on the hollow (and rotatable) output shaft 14, at least one stator fixed relative to the hollow output shaft 14, a plurality of magnets carried on the rotor, and windings carried by the stator. The planetary gearset 18 is coaxial with the drivetrain axis 16 and includes a sun gear 20, a planetary gearset carrier 22, one or more planet gears 23 and a ring gear 25. The sun gear 20 is coupled to or otherwise integrally formed on the hollow output shaft 14 of the axial flux electric motor 12. In some embodiments, the planetary gearset 18 is a compound planetary gearset having at least two sun gears and at least two sets of planet gears.

The differential 24 is coaxial with the drivetrain axis 16. While differential 24 is not limited to a particular configuration, in one or more embodiments, differential 24 may include an input mechanism 26, at least one intermediate gear 28, a first main driveshaft output gear 30, and a second main driveshaft output gear 32. In one or more embodiments the input mechanism may be a pinion arm, such as a C-shaped pinion arm or yolk, on which intermediate gears 28, in the form of pinion gears are mounted. In other embodiments, input mechanism may be one or more input gears. The input mechanism 26 is coupled to the planetary gearset carrier 22 of the planetary gearset 18. In some embodiments, the input mechanism 26 of the differential 24 is a ring gear and the at least one intermediate gear 28 is or includes at least one spider gear meshing with the input mechanism 26. The first main driveshaft output gear 30 is mounted on a first output carrier and meshes with the at least one intermediate gear 28, and the second main driveshaft output gear 32 is mounted on a second output carrier and meshes with the at least one intermediate gear 28. The first output carrier is attached to the first main driveshaft 34 and the second output carrier is coupled to the second main driveshaft 36. In some embodiments, the input gear 26 of the differential 24 includes first and second input gears each mounted on a differential input shaft. In such case, the at least one intermediate gear 28 may include a ring gear with teeth disposed about an inner periphery thereof. The first main driveshaft output gear 30 is mounted on a first output carrier and engages the ring gear, and the second main driveshaft output gear 32 is mounted on a second output carrier and also engages the ring gear. The first output carrier is attached to the first main driveshaft 34 and the second output carrier is coupled to the second main driveshaft 36. In other embodiments, the output carriers may be eliminated and the output gear 30, 32 may be mounted on the first and second main driveshafts 34, 36, respectively.

In other embodiments, the planetary gearset 18 is coupled to an output gear 32, which is coupled to output gear 30 by intermediate gear 28.

In one or more embodiments, the first main driveshaft output gear 30 and the second main driveshaft output gear 32 are each coupled independently to the at least one intermediate gear 28. In some embodiments, the at least one intermediate gear 28 is or includes one or more spider gears. In some embodiments, the at least one intermediate gear 28 is or includes one or more planetary gears. In some embodiments, the at least one intermediate gear 28 includes opposing planetary gears mounted on the planetary gearset carrier 22. In some embodiments, the at least one intermediate gear 28 is or includes opposing first and second pinion gears, and the ring gear has teeth disposed along an outer peripheral edge thereof with an opening at the center thereof into which the second main driveshaft output gear 32 extends.

In any event, as set forth above, differential 24 need not be limited to a particular configuration or arrangement in some embodiments.

The first main driveshaft 34 is coupled to the first main driveshaft output gear 30 and extends along the drivetrain axis 16. The second main driveshaft 36 is coupled to the second main driveshaft output gear 32 and extends along the drivetrain axis 16, passing coaxially through the planetary gearset 18, the hollow output shaft 14, and the axial flux electric motor 12. As a result, the second main driveshaft 36 extends from a first side 38 of the axial flux electric motor 12, and the hollow output shaft 14 extends from a second side 40 of the axial flux electric motor 12.

Electric drivetrain 10 may include a clutch assembly 42 to engage and disengage planetary gearset 18. In some embodiments, the clutch assembly 42 is an electric clutch assembly. In some embodiments, the clutch assembly 42 is a hydraulic clutch assembly. In some embodiments, clutch assembly 42 may be utilized engage and disengage the planetary gearset 18 from axial flux electric motor 12, while in other embodiments, clutch assembly 42 may be utilized engage and disengage the planetary gearset 18 from the differential 24.

Figure 4:
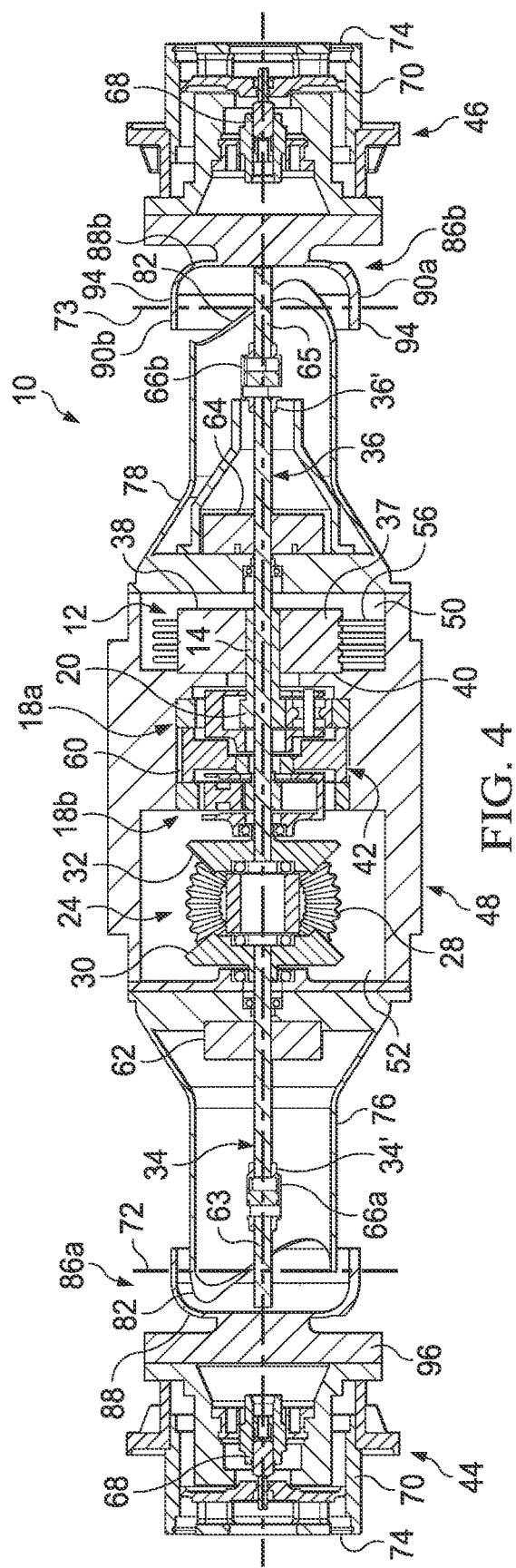
FIG. 4 is a cross-sectional view of another electric drivetrain, according to one or more alternative embodiments.
Figure 5:
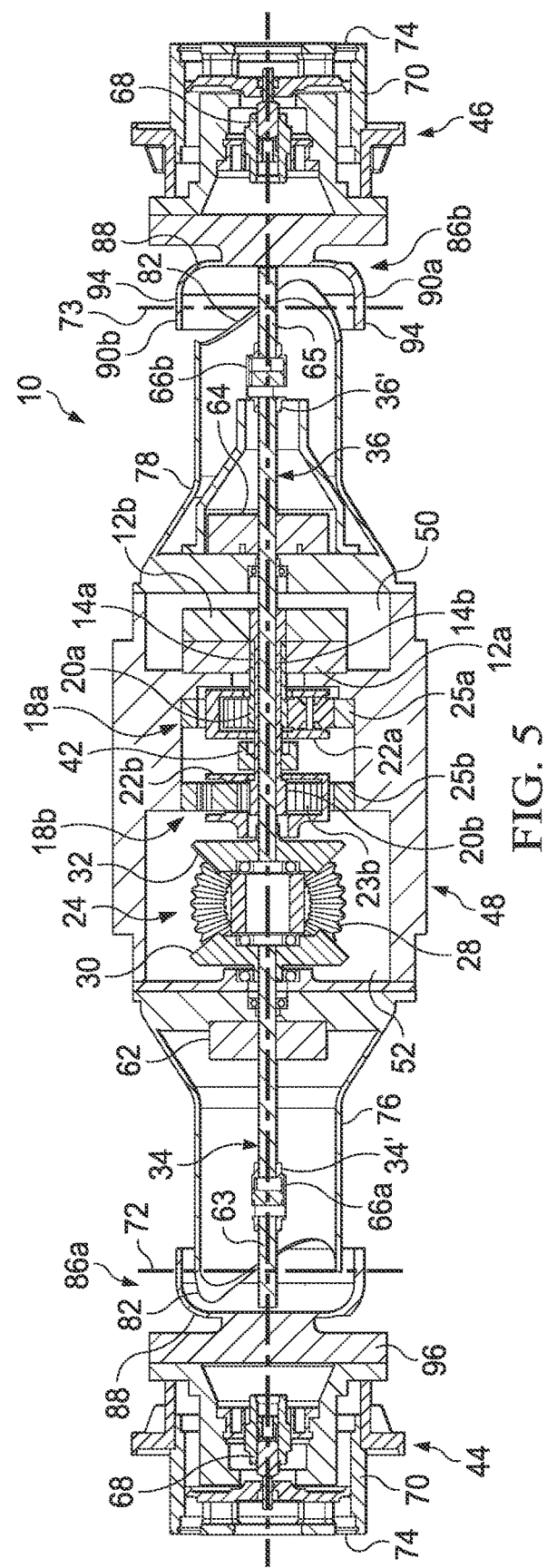
FIG. 5 is a cross-sectional view of another electric drivetrain having two axial flux electric motors, according to one or more alternative embodiments.

In still yet other embodiments, clutch assembly 42 may be utilized engage and disengage multiple planetary gearsets 18 from one another, such as is shown in FIGS. 4 and 5.

In some embodiments, clutch assembly 42 may include a spring assembly urging a first output carrier away from a second output carrier. A first magnet attached to one of the output carriers urged by the spring assembly, and a second magnet adjacent the first magnet. At least one of the first and second magnets is an electromagnet. For example, the first magnet may be a permanent magnet affixed to the first output carrier, which first output carrier is urged away from the second output carrier by the spring assembly, and the second magnet may be an energizable, fixed electromagnet, whereby the polarities of the first and second magnets are aligned so that energizing the second magnet will repel the first magnet against the force of the springs so as to fixedly engage the first and second output carriers. For another example, the first magnet may be a permanent magnet affixed to the first output carrier, which first output carrier is urged away from the second output carrier by the spring assembly, and the second magnet may be an energizable, fixed electromagnet that is coaxial about the drivetrain axis, whereby the polarities of the first and second magnets are aligned so that energizing the second magnet will repel the first magnet against the force of the springs so as to fixedly engage the first and second main driveshaft output gears.

A first wheel hub assembly 44 is coupled to the first main driveshaft 34, and a second wheel hub assembly 46 coupled to the second main driveshaft 36. A drivetrain housing 48 encloses the axial flux electric motor 12, the planetary gearset 18, and the differential 24. The drivetrain housing 48 may include a first chamber (or compartment) 50 in which the axial flux electric motor 12 is disposed, and a separate second chamber 52 in which the differential 24 and/or the planetary gearset 18 are disposed. For example, the first chamber 50 may contain potting compound for heat management and the second chamber 52 may contain oil (or some other lubricating liquid). In addition, a third chamber 60 may be formed in the drivetrain housing 48 between the first and second chambers 50 and 52, respectively. In some embodiments, the third chamber 60 may be open to or in fluid communication with the second chamber 52, with the planetary gearset 18 disposed in the third chamber 60.

Figure 3:
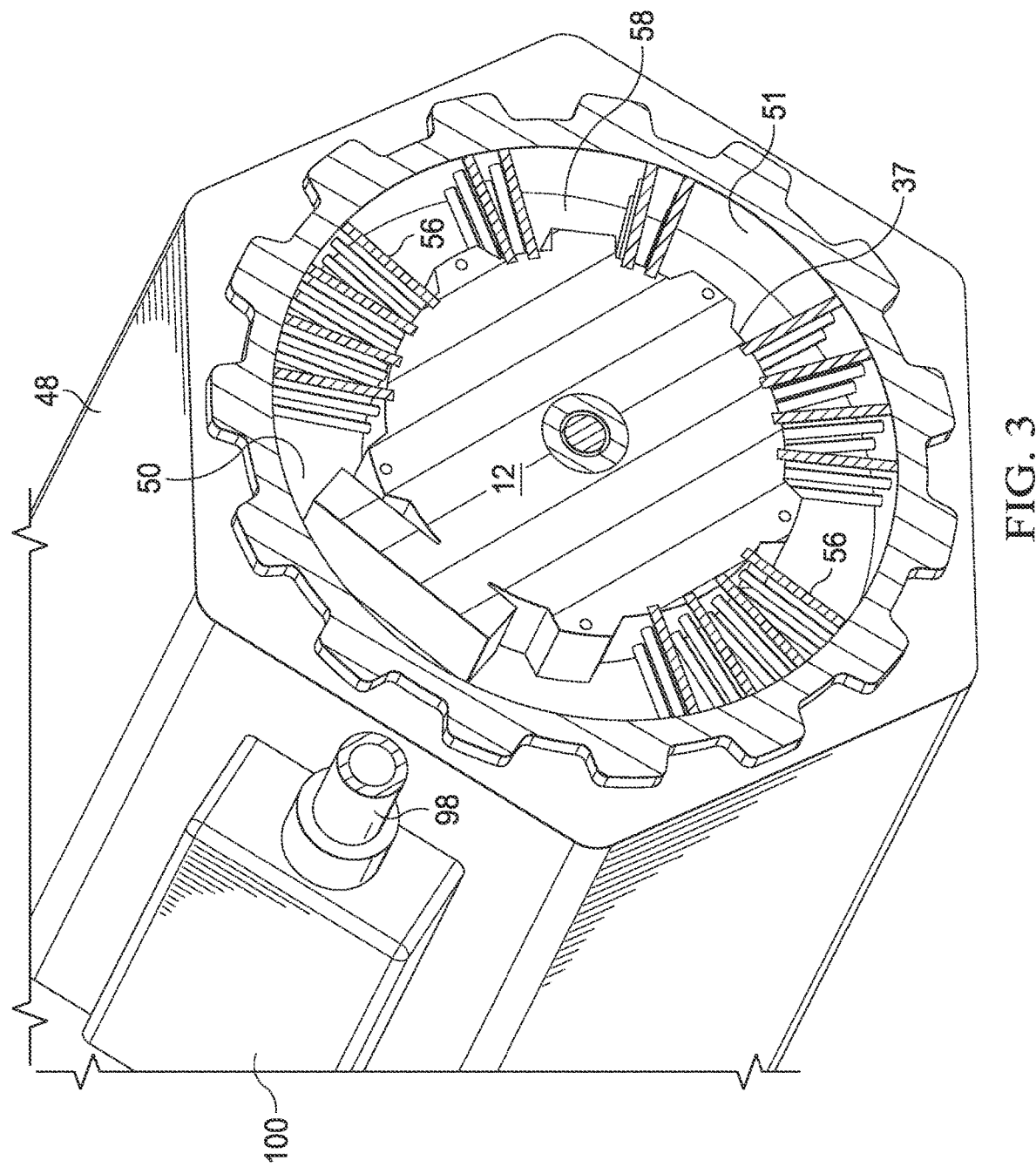
FIG. 3 is a cross-sectional view of the electric drivetrain of FIG. 1, according to one or more embodiments.

As best seen in FIG. 3, with ongoing reference to FIG. 1, in one or more embodiments, a heat dissipation mechanism 56 may be positioned adjacent axial flux electric motor 12 to remove heat during operation. Heat dissipation mechanism 56 is not limited to a particular structure. In some embodiments heat dissipation mechanism 56 may be external fins disposed about axial flux electric motor 12. In some embodiments, heat dissipation mechanism 56 may extend from motor housing 37. In other embodiments as shown, heat dissipation mechanism 56 may be one or more heat pipes that extend between axial flux electric motor 12 and the drivetrain housing 48. For example, a plurality of heat pipes may extend from the axial flux electric motor 12 and coupled to the drivetrain housing 48. In addition, or instead, the axial flux electric motor 12 may be spaced apart from an inner peripheral wall 51 of the first chamber 50 so that an air gap 58 is formed therebetween.

Referring back to FIGS. 1 and 2, a first brake 62 is positioned adjacent the first main driveshaft 34, and a second brake 64 is positioned adjacent the second main driveshaft 36. In one or more embodiments, each brake 62, 64 may be coaxially mounted along a corresponding main driveshaft 34, 36. In some embodiments, the first brake 62 may be disposed adjacent the differential 24 and second brake 64 may be disposed adjacent the axial flux electric motor 12. In one or more embodiments, the brakes 62, 64 may be electrically actuated. Brakes 62, 64 may be enclosed within additional chambers or cavities formed in drivetrain housing 48, or may be enclosed by wheel support housing 76, 78, respectively.

A first outer driveshaft 63 interconnects the first wheel hub assembly 44 to the first main driveshaft 34, and a second outer driveshaft 65 interconnects the second wheel hub assembly 46 to the second main driveshaft 36. A universal joint 66a is disposed between the first outer driveshaft 63 and the first main driveshaft 34, and a universal joint 66b is disposed between the second outer driveshaft 65 and the second main driveshaft 36. A hub gear assembly 68 is mounted within a wheel housing 70 of each wheel hub assembly 44 and 46. The first and second main driveshafts 34 and 36 have distal ends 34' and 36', respectively, and the wheel hub assemblies 44 and 46 are pivotally mounted adjacent the distal end 34' and 36' of the respective first and second main driveshafts 34 and 36. As a result, the first wheel hub assembly 44 is pivotal about a pivot axis 72 adjacent the distal end 34' of the first main driveshaft 34, said pivot axis 72 being perpendicular to the drivetrain axis 16. Additionally, the second wheel hub assembly 46 is pivotal about a pivot axis 73 adjacent the distal end 36' of the second main driveshaft 36, said pivot axis 73 being perpendicular to the drivetrain axis 16 (and substantially parallel with the pivot axis 72). Each wheel hub assembly 44 and 46 also includes a rotatable wheel hub 74.

A first wheel support housing 76 extends from the drivetrain housing 48 and is disposed about the first main driveshaft 34. A second wheel support housing 78 extends from the drivetrain housing 48 and is disposed about the second main driveshaft 36. The wheel support housing 76 and 78 each have a first closed end 80a attached to the drivetrain housing 48 and a second open end 80b from which the respective first and second main driveshafts 34 and 36 extend. For example, the second open end 80b of each wheel support housing 76 and 78 may be shaped to have an inner contour 82 on opposing sides thereof. In some embodiments, the inner contour 82 that is parabolic in shape.

A first yoke 86a is pivotally mounted on the first wheel support housing 76 adjacent the second open end 80b thereof. The first wheel hub assembly 44 is mounted on the first yoke 86a. The first yoke 86a has a base 88 with a first yoke arm 90a extending from the base 88, an opposing second yoke arm 90b extending from the base 88 adjacent to (but spaced apart from) the first yoke arm 90a, and a third yoke arm 92 (see FIG. 2) extending from the base 88 and away from the first and second yoke arms 90a, 90b. The first and second yoke arms 90a, 90b each having an end 94 pivotally attached to the first wheel support housing 76 on opposite sides thereof. The first yoke 86a further includes a mounting plate 96 adjacent the first and second yoke arms 90a, 90b. The first wheel hub assembly 44 is attached to the mounting plate 96 of first yoke 86a. A control shaft 98 (see FIG. 2) is pivotally coupled to the third yoke arm 92 and extends towards the drivetrain housing 48. In some embodiments, the control shaft 98 is substantially parallel with the drivetrain axis 16. As shown in FIG. 2, the control shaft 98 is engaged by a control mechanism 100 disposed to actuate the control shaft 98. In some embodiments, the control mechanism 100 is electric. In some embodiments, the control mechanism 100 is hydraulic. A second yoke 86b (substantially identical to the first yoke 86a) may also be pivotally mounted on the second wheel support housing 78 adjacent the second open end 80b of the second wheel support housing 78. As shown, the second wheel hub assembly 46 is mounted on mounting plate 96 of second yoke 86b.

Referring to FIG. 4, with continuing reference to FIGS. 1 through 3, in one or more other embodiments, the electric drivetrain 10 includes an axial flux electric motor 12 coaxial with drivetrain axis 16. Axial flux electric motor 12 is disposed to drive a hollow output shaft 14 extending along a drivetrain axis 16 from axial flux electric motor 12. In the embodiment of FIG. 4, electric drivetrain 10 includes a first planetary gearset 18a and a second planetary gearset 18b, each of which is coaxial with the drivetrain axis 16. First planetary gearset 18a may be engaged by coupled to hollow output shaft 14. In one or more embodiments, second planetary gearset 18b may be engaged and disengaged with either first planetary gearset 18a or hollow output shaft 14.

A differential 24 may be provided along drivetrain axis 16 and coaxial therewith. Although differential 24 is not limited to a particular configuration, in one or more embodiments, differential 24 may have a first main driveshaft output gear 30 and a second main driveshaft output gear 32, where the first main driveshaft output gear is mounted on a first main driveshaft 34 extending along the drivetrain axis 16. Likewise, a second main driveshaft output gear 32 may be mounted on a second main driveshaft 36 and extending along the drivetrain axis 16. The second main driveshaft 36 passes coaxially through the first planetary gearset 18a, the second planetary gearset 18b, the hollow output shaft 14, and the axial flux electric motor 12.

A clutch assembly 42 may be disposed to engage and disengage at least one of the planetary gearsets 18a, 18b. Thus, in some embodiments, clutch assembly 42 may be disposed between the first planetary gearset 18a and the second planetary gearset 18b to engage and disengage the two planetary gearsets 18a, 18b. In other embodiments, the clutch assembly 42 may engage and disengage a planetary gearset 18 and differential 24. Moreover, in other embodiments, cutch assembly 42 may be disposed to engage and disengage a planetary gearset 18 with the hollow output shaft 14, and more particularly, a sun gear 20 mounted along hollow output shaft 14.

FIG. 5 illustrates another embodiment of electric drivetrain 10, where two axial flux electric motors 12 are provided, namely a first axial flux electric motor 12a and a second axial flux electric motor 12b. Cooperating with the two axial flux electric motors 12a, 12b are two planetary gearsets 18, namely a first planetary gearset 18a and a second planetary gearset 18b where the first axial flux electric motor 12a is engaged with first planetary gearset 18a via a first hollow output shaft 14a, and the second axial flux electric motor 12b is engaged with second planetary gearset 18b via a second hollow output shaft 14b extending through first hollow output shaft 14a.

First planetary gearset 18a includes a first sun gear 20a mounted on first hollow output shaft 14a. First sun gear 20a engages one or more planet gears 23a mounted on first carrier 22a, which first planet gears 23a engage a first ring gear 25a.

Likewise, second planetary gearset 18b includes a second sun gear 20b mounted on second hollow output shaft 14b. Second sun gear 20b engages one or more planet gears 23b mounted on second carrier 22b, which second planet gears 23b engage a second ring gear 25b. In one or more embodiments, ring gears 25a, 25b may be a unitary ring gear.

While first axial flux electric motor 12a and second axial flux electric motor 12b are depicted as separate modules with separate motor housings 37, in other embodiments, persons of ordinary skill in the art will appreciate that first axial flux electric motor 12a may be a first rotor mounted on first hollow output shaft 14a and second axial flux electric motor 12b may be a second rotor mounted on second hollow output shaft 14b where the first and second rotors are all within the same motor housing 37, so long as each rotor may be separately energized to rotate its corresponding hollow output shaft 14.

In any event, clutch assembly 42 is provided and can be selectively actuated to engage and disengage first and second planetary gearsets 18a, 18b. In one or more embodiments, clutch assembly 42 may engage the sun gears 20a, 20b of the first and second planetary gearsets 18a, 18b. In one or more other embodiments, clutch assembly 42 may engage the carriers 22a, 22b of the first and second planetary gearsets 18a, 18b.

As generally described above, the electric drivetrain 10 of FIG. 5 may include a drivetrain housing 48 in which a first chamber (or compartment) 50 is defined and separate from a second chamber 52 in which the differential 24 and the planetary gearsets 18a, 18b are disposed. Second planetary gearset 18b is coupled to differential 24. It will be appreciated that as clutch assembly 42 is engaged and disengaged, first planetary gearset 18a may also be coupled to differential 24.

A first main driveshaft 34, and a second main driveshaft 36 extend from differential 24 where second main driveshaft 36 passes coaxially back through first hollow output shaft 14a and second hollow output shaft 14b, as well as first and second planetary gearsets 18a, 18b and first and second axial flux electric motors 12a, 12b.

An electric drivetrain has been disclosed. In one or more embodiments, the electric drivetrain may include an electric motor; first and second main driveshafts; and a differential driven by the electric motor, which differential, in turn, drives the first and second main driveshafts, wherein the second main driveshaft passes coaxially through the electric motor. In other embodiments, an electric drivetrain may include a hollow motor output shaft; first and second main driveshafts; and a differential driven by the hollow motor output shaft, which differential, in turn, drives the first and second main driveshafts, wherein the second main driveshaft passes coaxially through the hollow motor output shaft. In other embodiments, an electric drivetrain may include a planetary gearset; first and second main driveshafts; and a differential driven by the planetary gearset, which differential, in turn, drives the first and second main driveshafts, wherein the second main driveshaft passes coaxially through the planetary gearset. In other embodiments, an electric drivetrain may include a first axial flux electric motor disposed along a drivetrain axis; first and second main driveshafts extending along the drivetrain axis; and a differential driven by the electric motor, which differential, in turn, drives the first and second main driveshafts, wherein the second main driveshaft passes coaxially through the electric motor. In other embodiments, an electric drivetrain may include a first axial flux electric motor disposed along a drivetrain axis; a first planetary gearset disposed along the drivetrain axis; a second planetary gearset disposed along the drivetrain axis; a first hollow motor output shaft disposed along the drivetrain axis disposed to couple the first axial flux electric motor to one of the planetary gearsets; a differential disposed along the drivetrain axis and coupled to one of the planetary gearsets; a first main driveshaft coupled to the differential and extending along the drivetrain axis; a second main driveshaft coupled to the differential and extending along the drivetrain axis, wherein the second main driveshaft passes coaxially through the first and second planetary gearsets and the axial flux electric motor. In other embodiments, an electric drivetrain may include a first axial flux electric motor disposed along a drivetrain axis; a first planetary gearset disposed along the drivetrain axis; a second planetary gearset disposed along the drivetrain axis; a first hollow motor output shaft disposed along the drivetrain axis disposed to couple the first axial flux electric motor to one of the planetary gearsets; a clutch assembly disposed between the first and second planetary gearsets and actuatable to selectively engage and disengage the first and second planetary gearsets from one another; a differential disposed along the drivetrain axis and coupled to one of the planetary gearsets; a first main driveshaft coupled to the differential and extending along the drivetrain axis; a second main driveshaft coupled to the differential and extending along the drivetrain axis, wherein the second main driveshaft passes coaxially through the first and second planetary gearsets and the axial flux electric motor. In other embodiments, an electric drivetrain may include an axial flux electric motor having a hollow motor output shaft defined along a drivetrain axis; a planetary gearset coaxial with the drivetrain axis and having a sun gear coupled to the hollow output shaft of the axial flux electric motor, the planetary gearset comprising a planetary gearset carrier; a differential coaxial with the drivetrain axis, the differential having an input gear coupled to the planetary gearset carrier of the planetary gearset, at least one intermediate gear, a first main driveshaft output gear and a second main driveshaft output gear, each coupled independently to the intermediate gear; a first main driveshaft coupled to the first main driveshaft output gear and extending along the drivetrain axis; and a second main driveshaft coupled to the second main driveshaft output gear and extending along the drivetrain axis, wherein the second main driveshaft passes coaxially through the planetary gearset, the hollow output shaft, and the axial flux electric motor. In other embodiments, an electric drivetrain may include an axial flux electric motor having a hollow output shaft defined along a drivetrain axis; a first planetary gearset coaxial with the drivetrain axis and coupled to the hollow output shaft; a differential coaxial with the drivetrain axis, the differential having a first main driveshaft output gear and a second main driveshaft output gear; a first main driveshaft coupled to the first main driveshaft output gear and extending along the drivetrain axis; and a second main driveshaft coupled to the second main driveshaft output gear and extending along the drivetrain axis, wherein the second main driveshaft passes coaxially back through the planetary gearset, the hollow output shaft, and the axial flux electric motor.

For any one of the forgoing electric drivetrain embodiments, the following elements may be included, alone or in combination with any other elements:

A second planetary gearset disposed along the drivetrain axis.
  A differential disposed along the drivetrain axis and coupled to one of the planetary gearsets.
  The second main driveshaft passes coaxially through the first and second planetary gearsets and the axial flux electric motor.
  A clutch assembly disposed between the first and second planetary gearsets and actuatable to selectively engage and disengage the first and second planetary gearsets from one another.
  A clutch assembly disposed between the first and second planetary gearsets and actuatable to selectively engage and disengage the first hollow output shaft with one of the first and second planetary gearsets.
  The first hollow motor output shaft engages the first planetary gearset and the second planetary gearset is coupled to the differential.
  A second axial flux electric motor disposed along the drivetrain axis; and a second hollow motor output shaft, wherein the first hollow motor output shaft couples the first axial flux electric motor to one planetary gearset and the second hollow motor output shaft couples the second axial flux electric motor to the other planetary gearset.
  The first axial flux electric motor comprises a first rotor mounted on the first hollow motor output shaft and the second axial flux electric motor comprises a second rotor mounted on the second axial flux electric motor output shaft, wherein the first and second rotors are disposed in the same motor housing.
  A first wheel hub assembly disposed along the driveline axis and coupled to the first main driveshaft and a second wheel hub assembly disposed along the driveline axis and coupled to the second main driveshaft.
  A first brake disposed along the first main driveshaft and a second brake disposed along the second main driveshaft.
  A drivetrain housing enclosing the electric motor, differential and planetary gearsets, the drivetrain housing defining a first chamber in which the axial flux electric motor is disposed, a second chamber in which the differential is disposed, and a third chamber in which the planetary gearsets are disposed, wherein the second and third chambers are sealed and separate from the first chamber.
  A first wheel hub assembly disposed along the driveline axis and coupled to the first main driveshaft; a second wheel hub assembly disposed along the driveline axis and coupled to the second main driveshaft; a first brake disposed along the first main driveshaft; and a second brake disposed along the second main driveshaft.
  A second axial flux electric motor disposed along the drivetrain axis.
  A second hollow motor output shaft, wherein the first hollow motor output shaft couples the first axial flux electric motor to one planetary gearset and the second hollow motor output shaft couples the second axial flux electric motor to the other planetary gearset.
  The first axial flux electric motor comprises a first rotor mounted on the first hollow motor output shaft and the second axial flux electric motor comprises a second rotor mounted on the second axial flux electric motor output shaft, wherein the first and second rotors are disposed in the same motor housing.
  The differential comprises first and second main driveshaft output gears, wherein the first main driveshaft is coupled to the first main driveshaft output gear, and wherein the second main driveshaft is coupled to the second main driveshaft output gear.
  A planetary gearset coupled to the hollow motor output shaft, wherein the second main driveshaft also passes coaxially through the planetary gearset.
  The planetary gearset comprises: a sun gear coupled to the hollow motor output shaft; and a planetary gearset carrier.
  The differential further comprises an input gear coupled to the planetary gearset; and at least one intermediate gear, wherein the first and second main driveshaft output gears are each coupled independently to the at least one intermediate gear.

The first chamber contains potting compound and the second chamber contains oil.

The input gear of the differential is a ring gear, the intermediate gear is at least one spider gear meshing with the input gear, the first main driveshaft output gear is mounted on a first output carrier and meshes with the intermediate gear and the second axial output gear is mounted on a second output carrier and meshes with the intermediate gear, where the first output carrier is attached to the first main driveshaft and the second output carrier is coupled to the second main driveshaft.

The intermediate gears are opposing planetary gears mounted on the carrier.

The intermediate gear is one or more spider gears.

The intermediate gear is one or more planetary gears.

The intermediate gear is first and second opposing pinion gears and the ring gear has teeth disposed along an outer peripheral edge with an opening at the center of the ring gear and into which the second main driveshaft output gear extends.

The hollow output shaft of the axial flux electric motor is a spool through which the second main driveshaft passes.

A clutch assembly coaxially disposed along the drivetrain axis and mounted adjacent the planetary gearset, wherein the clutch assembly comprises a spring assembly urging one carrier away from the other carrier, a first magnet attached to the carrier urged by the spring and a second magnet adjacent the first magnet, wherein one of the magnets is an electromagnet.

The first magnet is a permanent magnet affixed to the first output carrier and the spring assembly urges the first output carrier away from the second output carrier, and the second magnet is an energizable, fixed electromagnet that is coaxial about the drivetrain axis, whereby the polarities of the first and second magnets are aligned so that energizing the second magnet will repel the first magnet against the force of the springs so as to fixedly engage the first and second output carriers.

The first magnet is a permanent magnet affixed to the first output carrier and the spring assembly urges the first output carrier away from the second output carrier, and the second magnet is an energizable, fixed electromagnet that is coaxial about the drivetrain axis, whereby the polarities of the first and second magnets are aligned so that energizing the second magnet will repel the first magnet against the force of the springs so as to fixedly engage the first and second main driveshaft output gears.

A first wheel hub assembly coupled to the first main driveshaft and a second wheel hub assembly coupled to the second main driveshaft.

The electric drivetrain of any claim, further comprising a drivetrain housing enclosing the axial flux electric motor, the planetary gearset, and the differential.

The drivetrain housing comprises a first compartment in which the axial flux electric motor is disposed and a separate second compartment in which the differential and planetary gearset is disposed.

The planetary gearset is a compound planetary gearset having at least two sun gears and at least two sets of planet gears.

A second planetary gearset coupled to the first planetary gearset.

The axial flux electric motor comprises at least one rotor mounted on a hollow output shaft.

The axial flux electric motor comprises at least one rotor mounted on a hollow, rotatable output shaft and at least one stator fixed relative to the hollow, rotatable output shaft, a plurality of magnets carried on the rotor; and windings carried by the stator.

The axial flux electric motor is spaced apart from the inner peripheral wall of the first chamber with an air gap formed there between.

A third chamber formed in the drivetrain housing between the first and second chambers, the third chamber being open to the second chamber, with the planetary gear set disposed in the third chamber.

A lubricating liquid disposed in the second chamber.

A clutch assembly disposed between the first planetary gearset and the differential.

A clutch assembly disposed between the first planetary gearset and the second planetary gearset.

The clutch assembly is an electric clutch assembly.

The clutch assembly is a hydraulic clutch assembly.

A first outer driveshaft interconnecting the first wheel hub assembly to the first main driveshaft and a second outer driveshaft interconnecting the second wheel hub assembly to the second main driveshaft.

A universal joint disposed between the first outer driveshaft and the first main driveshaft and a universal joint disposed between the second outer driveshaft and the second main driveshaft.

A wheel hub assembly further comprising a gear assembly mounted within a housing of the wheel hub assembly.

Each of the first and second main driveshafts have a distal end and each wheel hub assembly is pivotally mounted adjacent the distal end of the respective first and second main driveshafts.

Each wheel hub assembly is pivotal about a pivot axis adjacent the distal end of main driveshaft that is perpendicular to the drivetrain axis.

A first wheel support housing extending from the drivetrain housing and disposed about the first main driveshaft; and a second wheel support housing extending from the drivetrain housing and disposed about the second main driveshaft.

A yoke pivotally mounted on the wheel support housing adjacent the second end of the wheel support housing; wherein the hub assembly is mounted on the yoke.

The yoke has a yoke base with a first yoke arm extending from the base, an opposing second yoke arm extending from the base adjacent to but spaced apart from the first yoke arm, and a third yoke arm extending from the base away from the first and second yoke arms, the first and second yoke arms each having an end that is pivotally attached to the wheel support housing on opposite sides of the wheel support housing.

The yoke further comprises a mounting plate adjacent the first and second yoke arms, wherein the hub assembly is attached to the mounting plate.

A control shaft pivotally coupled to the third yoke arm and extending towards the motor housing.

The control shaft is substantially parallel with the drivetrain axis.

The control shaft is engaged by a control mechanism disposed to actuate the control shaft.

The control mechanism is electric.

The control mechanism is hydraulic.

A first yoke pivotally mounted on the first wheel support housing adjacent the second end of the first wheel support housing; wherein the first hub assembly is mounted on the first yoke; and a second yoke pivotally mounted on the second wheel support housing adjacent the second end of the second wheel support housing; wherein the second hub assembly is mounted on the second yoke.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed:

1. An electric drivetrain, comprising:
a first axial flux electric motor disposed along a drivetrain axis;
first and second main driveshafts extending along the drivetrain axis;
a single differential driven by the first axial flux electric motor, which differential, in turn, drives the first and second main driveshafts,
wherein the second main driveshaft passes coaxially through the first axial flux electric motor;
a first hollow motor output shaft disposed along the drivetrain axis and coupled to the first axial flux electric motor; and a first planetary gearset disposed along the drivetrain axis and coupled to the first hollow motor output shaft, wherein the second main driveshaft passes coaxially through the planetary gearset and the first hollow motor output shaft; and
an integrally formed drivetrain housing enclosing the electric motor and differential, the drivetrain housing defining a first chamber on one end of the housing in which the axial flux electric motor is disposed and a second chamber on the opposite end of the housing in which the differential is disposed, and a third chamber formed in the drivetrain housing and in which a first planetary gearset is disposed, the third chamber in fluid communication with the second chamber, wherein the second chamber is sealed and separate from the first chamber.

2. The electric drivetrain of claim 1, further comprising a second axial flux electric motor disposed along the drivetrain axis; a second planetary gearset disposed along the drivetrain axis; and a second hollow motor output shaft coupling the second axial flux electric motor to the second planetary gearset.

3. The electric drivetrain of claim 2, further comprising: a clutch assembly disposed between the first and second planetary gearsets and actuatable to selectively engage and disengage the first and second planetary gearsets from one another.

4. The electric drivetrain of claim 2, wherein the second hollow driveshaft extends coaxially within the first hollow driveshaft.

5. The electric drivetrain of claim 4, wherein the first planetary gearset comprises a first sun gear mounted on the first hollow driveshaft and the second planetary gearset comprises a second sun gear mounted on the second hollow driveshaft.

6. An electric drivetrain, comprising:
a first axial flux electric motor disposed along a drivetrain axis;
first and second main driveshafts extending along the drivetrain axis;
a single differential driven by the first axial flux electric motor, which differential, in turn, drives the first and second main driveshafts,
wherein the second main driveshaft passes coaxially through the first axial flux electric motor;
a first hollow motor output shaft disposed along the drivetrain axis and coupled to the first axial flux electric motor; and a first planetary gearset disposed along the drivetrain axis and coupled to the first hollow motor output shaft, wherein the second main driveshaft passes coaxially through the planetary gearset and the first hollow motor output shaft; and
an integrally formed drivetrain housing enclosing the electric motor and differential, the drivetrain housing defining at least a first chamber on one end of the housing in which the axial flux electric motor is disposed and at least a second chamber on the opposite end of the housing in which the differential is disposed, wherein the second chamber is sealed and separate from the first chamber,
wherein the differential is disposed along the drivetrain axis.

7. An electric drivetrain, comprising:
a first axial flux electric motor disposed along a drivetrain axis;
a first planetary gearset disposed along the drivetrain axis;
a first hollow motor output shaft disposed along the drivetrain axis disposed to couple the first axial flux electric motor to the first planetary gearset;
a differential disposed along the drivetrain axis and coupled to the first planetary gearset;
a first main driveshaft coupled to the differential and extending along the drivetrain axis;
a second main driveshaft coupled to the differential and extending along the drivetrain axis, wherein the second main driveshaft passes coaxially through the first planetary gearset and the axial flux electric motor.

8. The electric drivetrain of claim 7, further comprising: a clutch assembly disposed between the first and second planetary gearsets and actuatable to selectively engage and disengage the first and second planetary gearsets from one another.

9. The electric drivetrain of claim 8, wherein the first hollow motor output shaft engages the first planetary gearset and the second planetary gearset is coupled to the differential.

10. The electric drivetrain of claim 7, further comprising: a clutch assembly disposed between the first and second planetary gearsets and actuatable to selectively engage and disengage the first hollow output shaft with one of the first and second planetary gearsets.

11. The electric drivetrain of claim 7, further comprising a second axial flux electric motor disposed along the drivetrain axis; and a second hollow motor output shaft, wherein the first hollow motor output shaft couples the first axial flux electric motor to one planetary gearset and the second hollow motor output shaft couples the second axial flux electric motor to the other planetary gearset.

12. The electric drivetrain of claim 11, wherein the first axial flux electric motor comprises a first rotor mounted on the first hollow motor output shaft and the second axial flux electric motor comprises a second rotor mounted on the second axial flux electric motor output shaft, wherein the first and second rotors are disposed in the same motor housing.

13. The electric drivetrain of claim 7, further comprising a first wheel hub assembly disposed along the driveline axis and coupled to the first main driveshaft and a second wheel hub assembly disposed along the driveline axis and coupled to the second main driveshaft.

14. The electric drivetrain of claim 7, further comprising a first brake disposed along the first main driveshaft and a second brake disposed along the second main driveshaft.

15. An electric drivetrain, comprising:
a first axial flux electric motor disposed along a drivetrain axis;
a first planetary gearset disposed along the drivetrain axis;
a second planetary gearset disposed along the drivetrain axis;
a first hollow motor output shaft disposed along the drivetrain axis disposed to couple the first axial flux electric motor to one of the planetary gearsets;
a clutch assembly disposed between the first and second planetary gearsets and actuatable to selectively engage and disengage the first and second planetary gearsets from one another;
a differential disposed along the drivetrain axis and coupled to one of the planetary gearsets;
a first main driveshaft coupled to the differential and extending along the drivetrain axis;
a second main driveshaft coupled to the differential and extending along the drivetrain axis, wherein the second main driveshaft passes coaxially through the first and second planetary gearsets and the axial flux electric motor; and
a drivetrain housing enclosing the electric motor, differential and planetary gearsets, the drivetrain housing defining a first chamber in which the axial flux electric motor is disposed, a second chamber in which the differential is disposed, and a third chamber in which the planetary gearsets are disposed, wherein the second and third chambers are sealed and separate from the first chamber.

16. The electric drivetrain of claim 15, further comprising a first wheel hub assembly disposed along the driveline axis and coupled to the first main driveshaft; a second wheel hub assembly disposed along the driveline axis and coupled to the second main driveshaft; a first brake disposed along the first main driveshaft; and a second brake disposed along the second main driveshaft.

17. The electric drivetrain of claim 15, further comprising a second axial flux electric motor disposed along the drivetrain axis.

18. The electric drivetrain of claim 17, further comprising a second hollow motor output shaft, wherein the first hollow motor output shaft couples the first axial flux electric motor to one planetary gearset and the second hollow motor output shaft couples the second axial flux electric motor to the other planetary gearset.

19. The electric drivetrain of claim 18, wherein the first axial flux electric motor comprises a first rotor mounted on the first hollow motor output shaft and the second axial flux electric motor comprises a second rotor mounted on the second axial flux electric motor output shaft, wherein the first and second rotors are disposed in the same motor housing.

* * * * *